United States Patent [19]

Hengen

[11] 4,139,013
[45] Feb. 13, 1979

[54] THRESHING ROTOR FOR A COMBINE

[75] Inventor: Edward J. Hengen, Bettendorf, Iowa

[73] Assignee: Deere & Company, Moline, Ill.

[21] Appl. No.: 843,987

[22] Filed: Oct. 20, 1977

[51] Int. Cl.² ............................................. A01F 12/18
[52] U.S. Cl. .................................. 130/27 H; 56/14.6
[58] Field of Search ...................... 130/27 R-27 AD; 56/14.6

[56] References Cited

U.S. PATENT DOCUMENTS

| 918,285 | 4/1909 | Clark | 130/27 S |
|---|---|---|---|
| 3,079,924 | 3/1963 | Dietrich | 130/27 HA |
| 3,306,302 | 2/1967 | Mark et al. | 130/6 X |
| 3,848,609 | 11/1974 | Mortier et al. | 130/27 T |

Primary Examiner—Russell R. Kinsey

[57] ABSTRACT

The axial flow rotary separator of a combine includes a rotor having a generally cylindrical threshing section surrounded by a fixed, non-adjustable concave or grate so as to define an annular threshing space. The rotor includes threshing bar assemblies pivoted about axes parallel to the rotor axis and spring loaded in the direction of reducing concave clearance, against adjustable stops. Setting of the stops is controlled by adjusting eyebolts mounted on the front of the rotor, accessible from the front of the combine and connected to the stops through a pivot arm assembly. In normal operation springs hold the threshing bar assemblies against the stops but the pressure of a large foreign body or an excessive flow or material entering the threshing space may overcome the spring pressure forcing the threshing bars to retract to provide necessary clearance.

25 Claims, 6 Drawing Figures

THRESHING ROTOR FOR A COMBINE

BACKGROUND OF THE INVENTION

This invention relates to a separator for agricultural crops such as grain and more particularly to an improved rotor for such a machine.

Agricultural crop separators, especially those embodied in combines are well known. A combine advances over a field to gather crop material and feed it to the crop separator where typically grain is threshed out, separated from straw, chaff and other material, cleaned and delivered to a grain tank. The separator typically includes a threshing cylinder of considerable mass rotating at high speed in close proximity to an adjustable concave or grate, the radial space or clearance between the two being a threshing zone. In gathering crop material from the surface of a field, there is a risk or an unseen foreign body, such as a rock, being delivered with crop material to the threshing zone and, if the rock is significantly larger than the clearance between the concave and cylinder, serious damage may result to those parts. Further, unexpected sudden increases in the rate of feeding may occur, exceeding momentarily the capacity of the cylinder and concave and imposing excessive loads on them as well as on related drive and structural parts.

In separators of the type where a concave only partially surrounds a threshing cylinder, it is known to mount the concave in such a way that it can be deflected generally radially away from the threshing cylinder so as to pass a large foreign body. Typically, springs are used to return the concave to normal working position after the body has passed through the threshing zone. It is also known to provide the surface of the threshing bar of a conventional threshing cylinder with a flexible layer of elastomeric material, both to provide a more gentle threshing action and, it has been claimed, to provide a threshing bar which is partially deformable to provide slightly greater concave clearance for heavy flows of crop material. But the deformability of such threshing bars is very limited and certainly not sufficient to cope with potentially damaging foreign bodies and, in addition, provision for adjustment of concave to cylinder clearance must still be provided in the mounting of the concave itself in order to provide, for example, for the widely differing threshing requirements of such crops as corn and small grains. In an axial flow machine in which a cylindrical grate or concave completely surrounds a threshing cylinder, provision of a radially retractable concave or grate is less feasible. Provision for radial retraction to permit the passage of larger objects would, almost of necessity, require splitting of the cylinder. In operation, such splitting would produce discontinuities in the grate surface providing an impedance to the passage of a foreign body such as a rock and also potentially increasing mechanical damage to the grain being threshed.

In axial flow machines having a frusto-conical rotor and grate, it is known to provide for axial deflection of the rotor away from the grate when a foreign body or "slug" of material imposes sufficient force. However, unless the cone angle of the grate is quite flat, an inconveniently large axial movement is required to produce the necessary increase in clearance between rotor and grate and the support and bias structure required may become quite cumbersome.

SUMMARY OF THE INVENTION

Accordingly, it is an object of the present invention to provide a threshing cylinder for a crop separator which eliminates the need for adjustable or retractable mounting of a concave and in particular a rotor or threshing cylinder permitting the use of a fixed circumferentially continuous cylindrical or frusto-conical threshing grate portion in an axial flow rotary separator. It is a further object to provide a threshing cylinder for an axial flow rotary separator which does not rely on axial displacement between cylinder and concave to provide variable clearance between these elements.

It is a feature of the invention to bias a pivotally mounted threshing bar outwards in the direction of decreasing concave clearance against a stop, the stop being adjustable to provide for setting the radial clearance between threshing bar and grate according to crop and operating requirements. It is another feature of the invention that a threshing bar encountering a large foreign object or a sudden increase or "slug" in the flow of crop material can be deflected away from the inner surface of the grate to accommodate the object or "slug" and reduce impact forces, and that the bias means returns the threshing bar to normal operating position against the stop after passage of the object or "slug".

It is a feature of the invention to provide adjustment means for rotor to concave clearance that are simple and conveniently accessible.

It is yet another feature of the invention to arrange the pivoting of the threshing bar so that the attitude of the threshing bar to the grate changes little as the threshing bar pivots between positions of minimum and maximum clearance. In particular it is arranged that the clearance is greater at the leading edge than at the trailing edge of the threshing bar and that this difference decreases slightly as the bar pivots to a position of greater clearance.

It is also a feature that, in terms of direction of rotation, the threshing bar trails its pivot point giving it a natural stability and permitting it to float smoothly between positions of varying grate clearance as required to accommodate large and sudden variations in the flow of crop material or a foreign body entering the threshing zone.

It is a feature of the invention to support and bias the threshing bar assembly in such a way that, for example, a pair of threshing bar assemblies may be mounted in the rotor, with each assembly carrying two or more threshing bars, and with the sets of bars being diametrically opposite each other and the support and biasing means overlapping inside the threshing cylinder. It is a feature to house the threshing bar assembly pivot support and bias means within a housing or core such as a generally cylindrical drum with openings from which the threshing bars emerge, the diameter of the drum being of a somewhat lesser diameter than the effective swept diameter of the threshing bars when in their fully retracted position.

An advantage of the invention is that in an axial flow rotary separator embodiment the grate surrounding the threshing cylinder, being fixed and non-adjustable, may be made an integral part of the separator frame structure providing structural efficiency and economy. The grate may also be made circumferentially continuous, avoiding discontinuities which may impede the flow of material and contribute to grain damage.

Providing for adjustment of clearance in the threshing cylinder of a rotary separator rather than in the grate is a particular advantage when the separator includes a cleaner portion surrounding and enclosing the grate, and especially if the cleaner portion rotates. To provide the necessary grate adjusting linkage in such an environment would be awkward and complicated.

Another advantage of the invention is that when two or more generally parallel threshing bars are mounted on one threshing bar assembly with the leading threshing bar having slightly more grate clearance than the bar trailing it, threshing efficiency is increased and power consumption is reduced.

A particular advantage of the invention is to provide a rotor or cylinder and grate combination that can accommodate a rapidly fluctuating flow of crop material and/or the entry of foreign objects without blockage or damage to structure and one that minimizes peak loads and torques in components and drive systems.

DESCRIPTION OF THE PREFERRED EMBODIMENT

Figure 1:
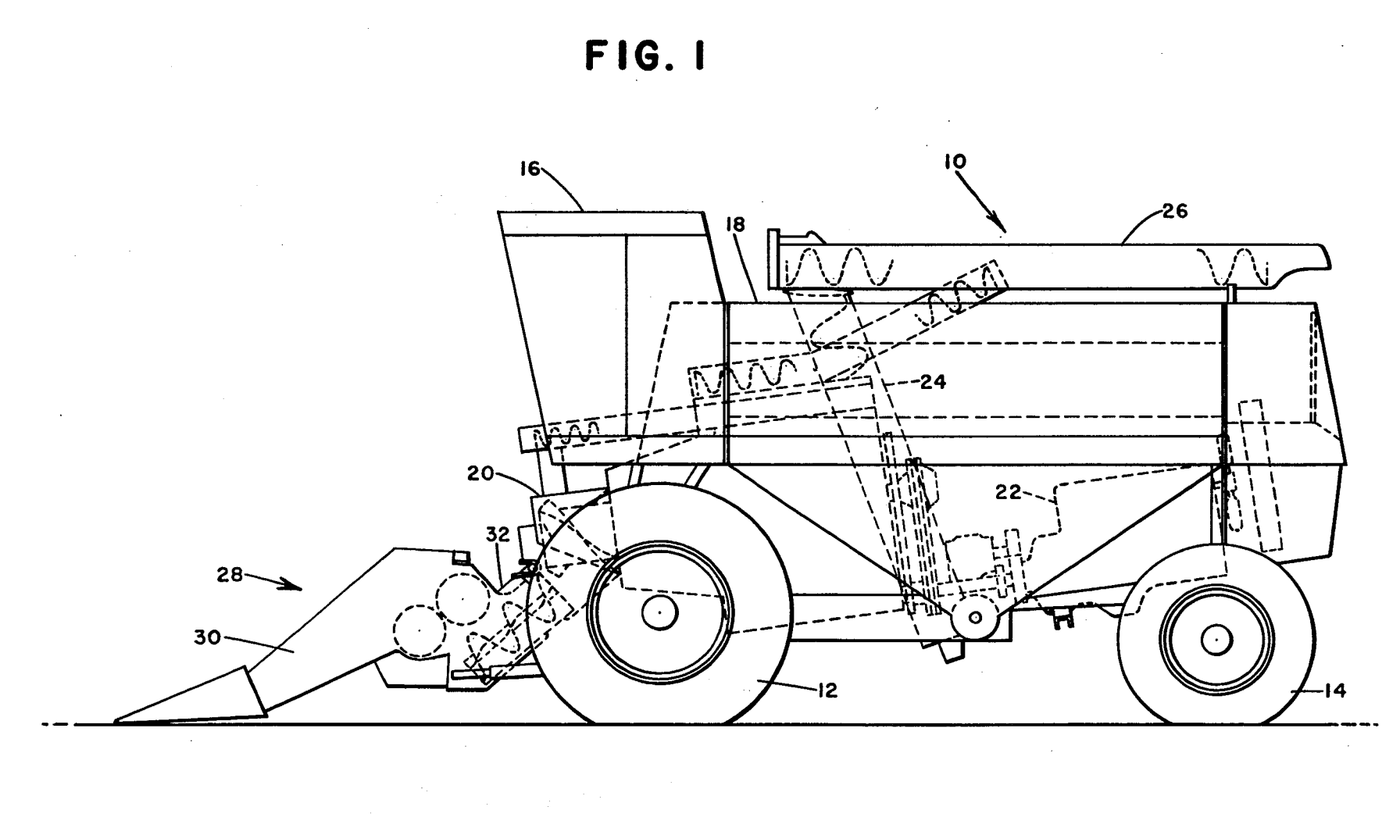
FIG. 1 is a left side elevation of a combine harvester embodying the invention.

The invention is embodied in a self-propelled combine having a main separator body indicated generally by the numeral 10 and supported by a pair of laterally spaced forward drive wheels 12 and steerable rear wheels 14 (FIG. 1). An elevated operator's station 16 is mounted forward on the body towards the left hand side of the machine and immediately ahead of a saddle-type grain tank 18. The grain tank 18 straddles the machine and partially encloses a forward mounted rotary separator or crop processing unit indicated generally by the numeral 20 and a rear mounted engine 22 providing power for propelling the combine and driving all its components. A grain unloading system includes a vertical auger conveyor 24 and a swingable unloading auger conveyor 26. A combine of this general construction is described more fully in U.S. Pat. No. 4,060,960 assigned to the assignee of the present application.

Mounted immediately ahead of the separator 20 is a header 28 including a gathering unit 30, such as a conventional corn head and shown in FIG. 1 only, for gathering a crop as the combine advances over a field and delivering crop material to a feeder house 32 which in turn delivers it rearwardly and upwardly to the front of the rotary separator 20. A feeder house of a type suitable for feeding a rotary separator is described fully in U.S. Pat. No. 4,082,953 also assigned to the assignee of the present application.

The rotary separator 20 is shown schematically in some detail in FIG. 2 and will be described here only in general terms as a separator of this general type is fully described in copending application Ser. No. 825,537 also assigned to the assignee of the present invention.

The rotary separator 20 includes a fixed fore-and-aft extending housing, indicated generally by the numeral 34 having a forward infeed housing portion 36 comprising a generally cylindrical casing with internal helical ribs 38. A forward lower portion of the infeed housing 36 is cut away to create a forwardly and downwardly directed infeed housing opening 40 communicating with the feeder house 32. The forward upper portion of the infeed housing is closed by a generally vertical wall 42. Extending rearwardly from the infeed housing 36 is a generally cylindrical threshing grate 44 including helical elements 46. Rigidly attached to and extending rearwards from the threshing grate 44 is a frusto-conical separator grate 48 having a wall including helical elements 50. The forward end of the housing assembly 34 is supported from the main frame of the combine by suitable brackets (not shown). The rearward end of the housing 34 is supported through a series of radially extending offset straps 52 extending radially outwards from the rearward end of the separator grate 48 (one strap 52 only is shown in FIG. 2). The outer ends of the straps 52 are attached rigidly to an annular mounting assembly 54 which in turn is supported from the combine frame by suitable brackets (not shown in the drawings). The annular mounting assembly 54 carries support rollers 56 (one only of which is shown in FIG. 2) partially extending through the inner wall of the assembly.

The housing 34 surrounds a rotor indicated generally by the numeral 58 supported for rotation in front and rear bearings 60 and 62, respectively, and driven through a V-belt sheave 64 by belts not shown in the drawings.

Extending forward from the annular mounting assembly 54 is a cleaner housing 66 including a forward annular clean grain channel 68 and adjacently rearward an annular tailings channel 70.

Partially enclosed by the cleaner housing 66 is a grain cleaner assembly 72 which is supported at its forward end by a yoke assembly 74 which includes means for rotating and axially reciprocating the grain cleaner assembly 72. The rear end of the grain cleaner assembly 72 rides on the rollers 56 carried by the annular mounting assembly 54.

Extending rearwards from the annular mounting assembly 54 is a fan housing 76 which has a downwardly directed opening or discharge chute 78. A centrifugal fan 80 within the housing 76 is journaled on a bearing 82 and is coaxial with the rotor 58 and driven through a fan sheave 84 by a V-belt (not shown).

A clean grain auger indicated generally by the numeral 86 is mounted on top of the separator 20 and receives clean grain from the clean grain channel 68 through an opening (not shown) in the cleaner housing 66 and delivers it rearwardly and upwardly to the grain tank. In a similar way, a tailings auger 88 receives tailings from the tailings channel 70 and conveys them forward for delivery through the wall of the infeed housing 36 by a tailings chute 90.

Figure 2:
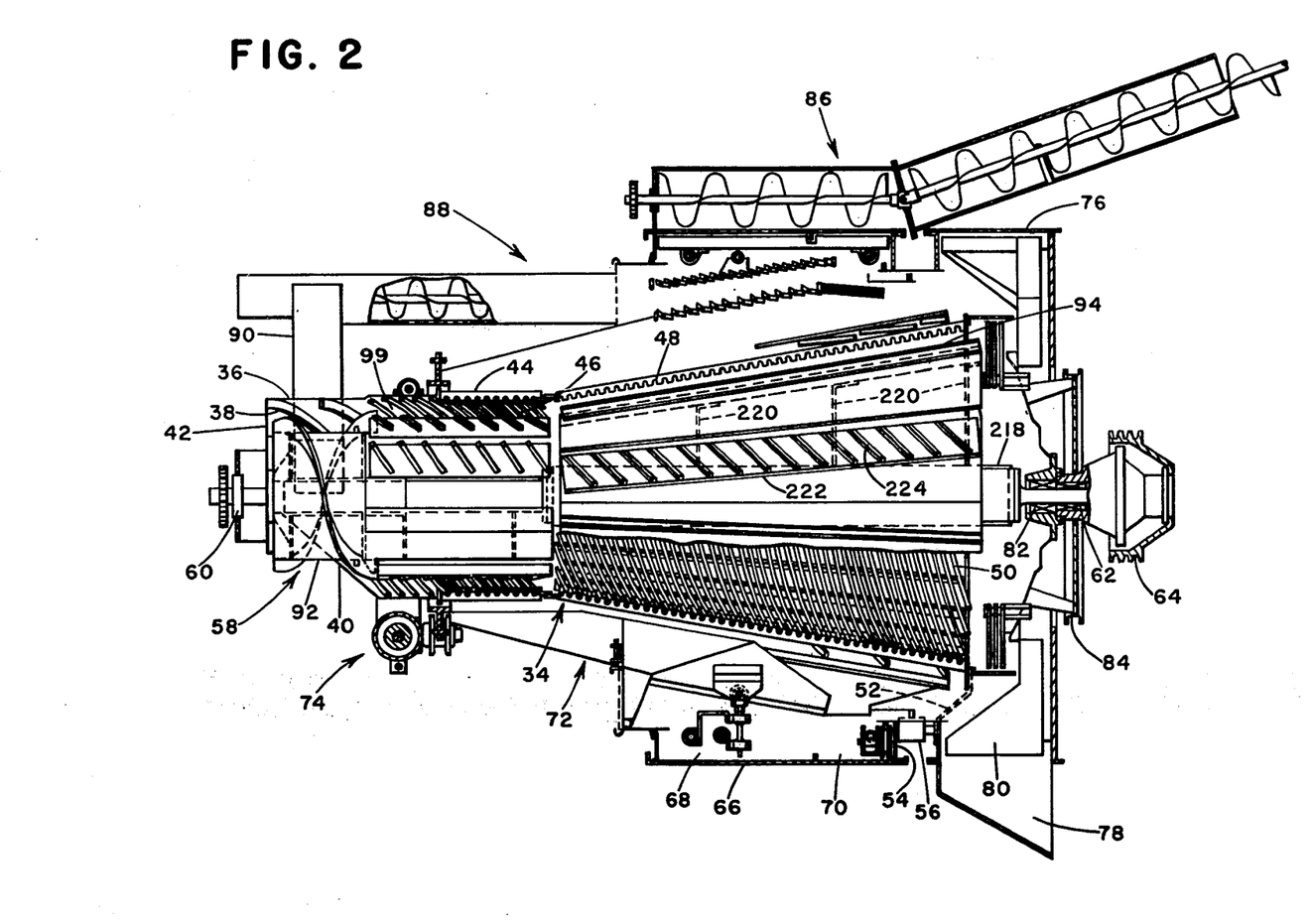
FIG. 2 is a left side elevation of the axial flow rotary separator of the combine, variously cut away and sectioned to better show components of the separator.

Looking at the rotor 58 in more detail and referring first to FIG. 2, the rotor includes a forward cylindrical portion 92 and a rearwardly diverging frusto-conical separator portion 94 having an effective diameter at its forward end approximately equal to the diameter of the cylindrical portion 92.

Figure 3:
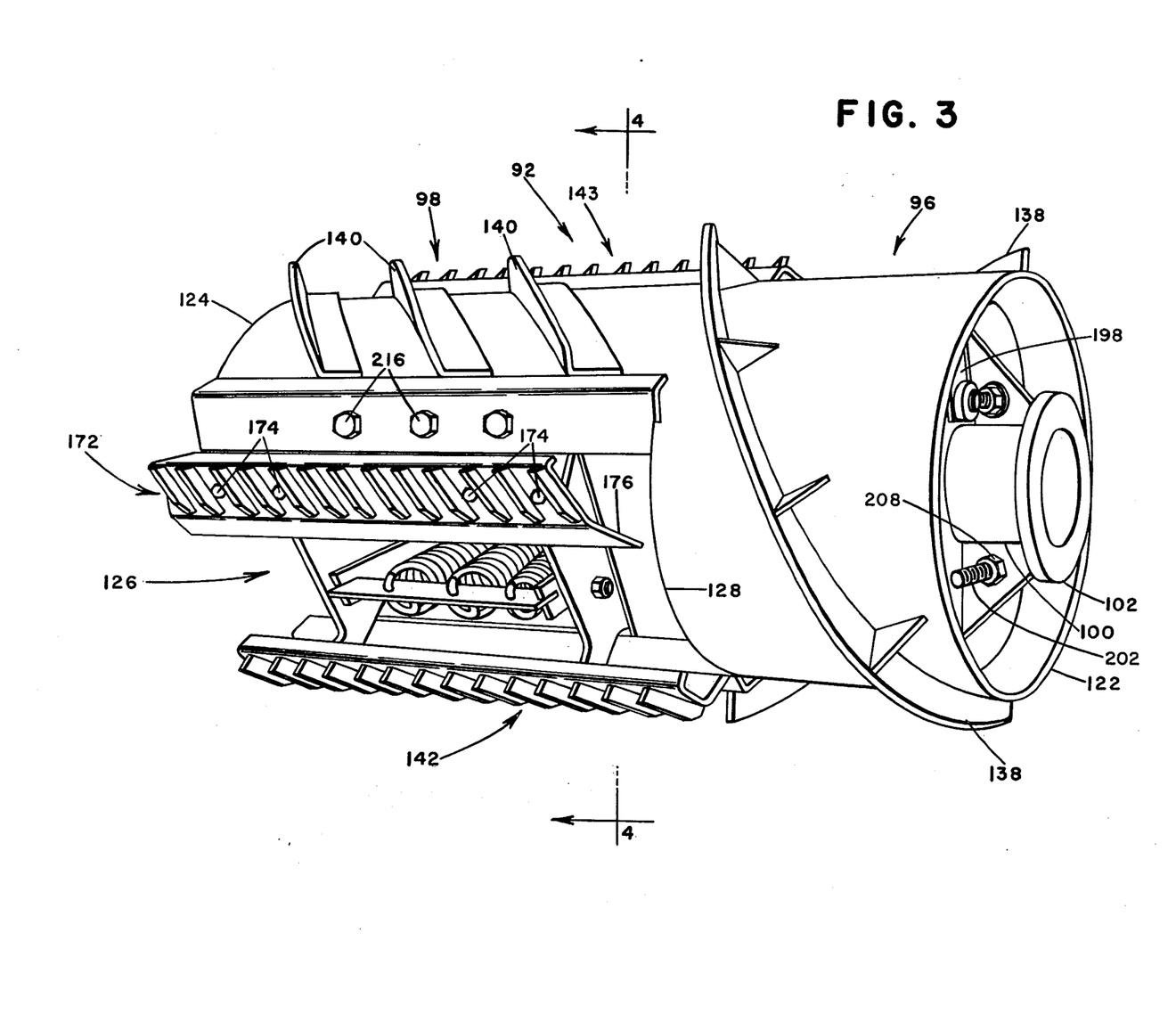
FIG. 3 is a right front perspective view of the forward portion of the rotor of the axial flow separator of FIG. 2.
Figure 5:
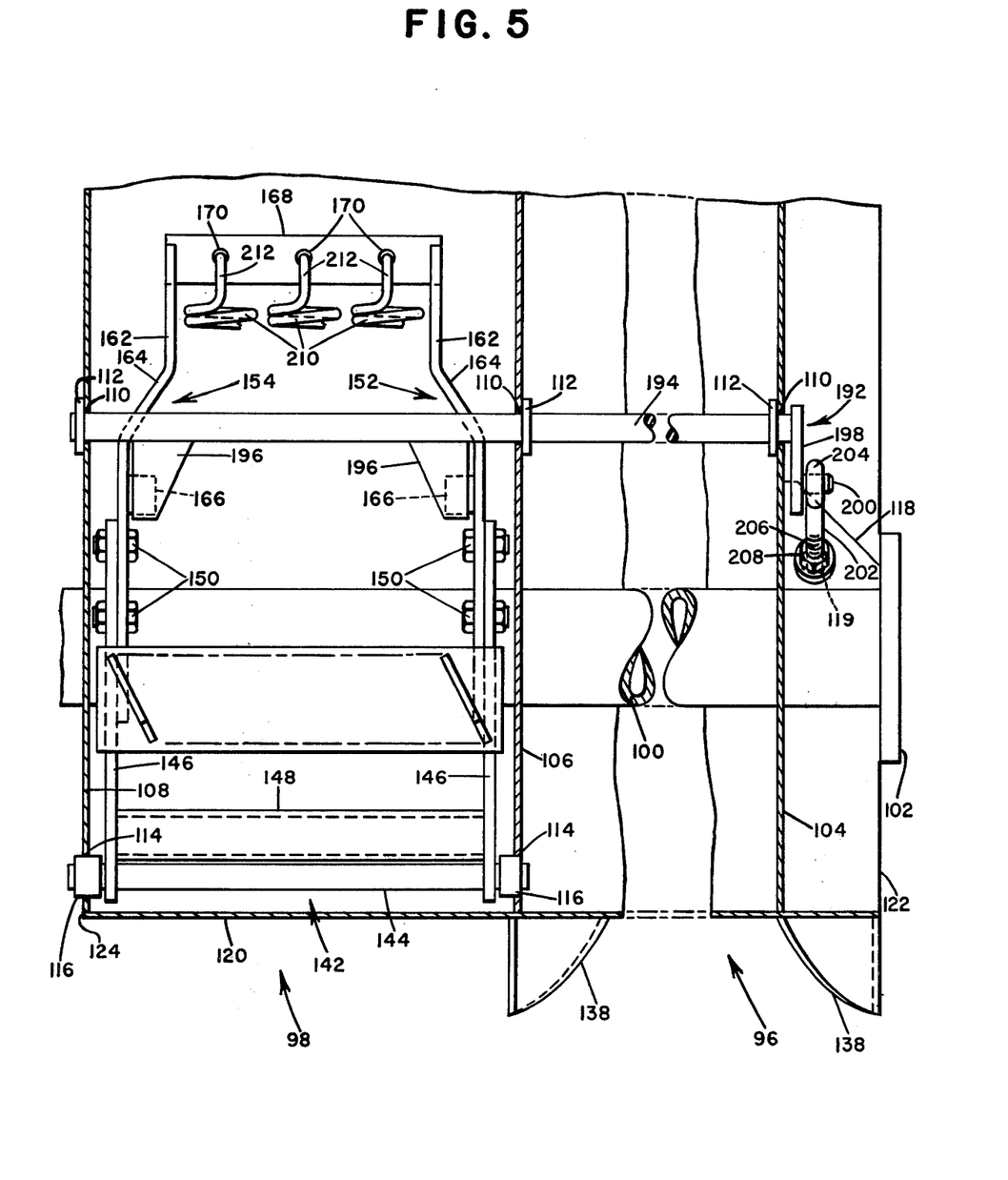
FIG. 5 is a simplified diagrammatic view generally on arc 5—5 of FIG. 4 but with the grate removed and parts cut away and only one threshing bar indicated for clarity.

The foward cylindrical portion of the rotor 92 includes a front infeed portion 96 and a rearward threshing portion 98 constituting a threshing rotor (best seen in FIG. 3). The rotor threshing portion 98 is surrounded by the threshing grate 44 and the annular space between them constitutes a threshing zone 99, the rearward end or outlet of which communicates with the annular space between the separator grate 48 and rotor separator portion 94. The rotor's cylindrical portion 92 includes a central tube 100 at the forward end of which is a rigidly attached mounting flange 102. Rigidly attached to and extending radially from the central tube 100 are forward, intermediate and rear bulkheads 104, 106 and 108, respectively, (seen best in FIG. 5). Each bulkhead includes adjacent its outer edge a pair of diametrically opposite adjusting rod holes 110, each hole being reinforced by a rigidly attached bearing washer 112. The intermediate and rear bulkheads 106 and 108, respectively, also include adjacent their outer periphery a pair of diametrically opposite pivot rod holes 114, each hole being circumferentially adjacent an adjusting rod hole 110 and each pivot rod hole 114 carrying a rigidly attached pivot rod bushing 116. A pair of diametrically opposite gussets 118, each having an approximately central hole 119, is welded between the forward bulkhead 104, the flange 102 and the forward portion of the tube 100.

A generally cylindrical shell or core 120, concentric with the tube 100, surrounds and is attached rigidly to the bulkheads 104, 106 and 108 and has a forward edge 122 approximately aligned with the flange 102 and a rearward edge 124 extending slightly rearward of the rear bulkhead 108. The central tube 100, bulkheads 104, 106 and 108 and shell 120 constitute part of a frame of the rotor 58. The rear portion of the shell 120 is cut away to provide diametrically opposite openings 126 (seen best in FIGS. 3 and 6), each opening having a forward edge 128 and longitudinally extending leading and trailing edges 130 and 132, respectively. A spring support member 134 lies along and is rigidly attached to the shell at each trailing edge 132. Each spring support member 134 includes a set of three longitudinally aligned spring retainer holes 136.

A pair of diametrically opposed helical flightings or material control elements 138 are mounted on the outside of the forward portion of the shell 120 extending axially from approximately the forward edge 122 of the shell to the forward edge 128 of the opening 126. Additional helical flighting sections or material control elements 140 are mounted in diametrically opposite spaced pairs on the rearward portions of the shell between the openings 126.

A pair of pivoting diametrically opposed threshing bar assemblies indicated generally by the number 142 and 143, respectively, each include a longitudinally aligned pivot rod 144, journaled adjacent its opposite ends in the bushings 116 of the intermediate and rear bulkheads 106 and 108, respectively. Mounted on the pivot rod 144, between the bushings 116, are a pair of pivot arms 146 extending perpendicularly from the pivot rod and spaced by a rigidly attached tubular pivot brace 148. Overlapping the free end of each pivot arm 146 and attached to the arms by suitable fasteners 150 are respectively forward and rear threshing bar carriers 152 and 154. Each threshing bar carrier includes circumferentially spaced leading and trailing threshing bar support flanges, 156 and 158 respectively, separated by a relief or cut out 160 in the periphery of the carrier. The threshing bar carriers 152 and 154 also each include a spring arm portion 162 extending generally perpendicularly from the pivot arms 146 opposite the threshing bar support flanges 156 and 158 and each including an offset portion 164. Each spring arm portion 162 carries a rigidly attached cylindrical stop boss 166 extending inwards into the space between the respective spring arms 162. The free ends of the spring arms 162 are speced by a rigidly attached longitudinally attached spring bar 168, the bar including a set of three spring attaching holes 170.

Figure 4:
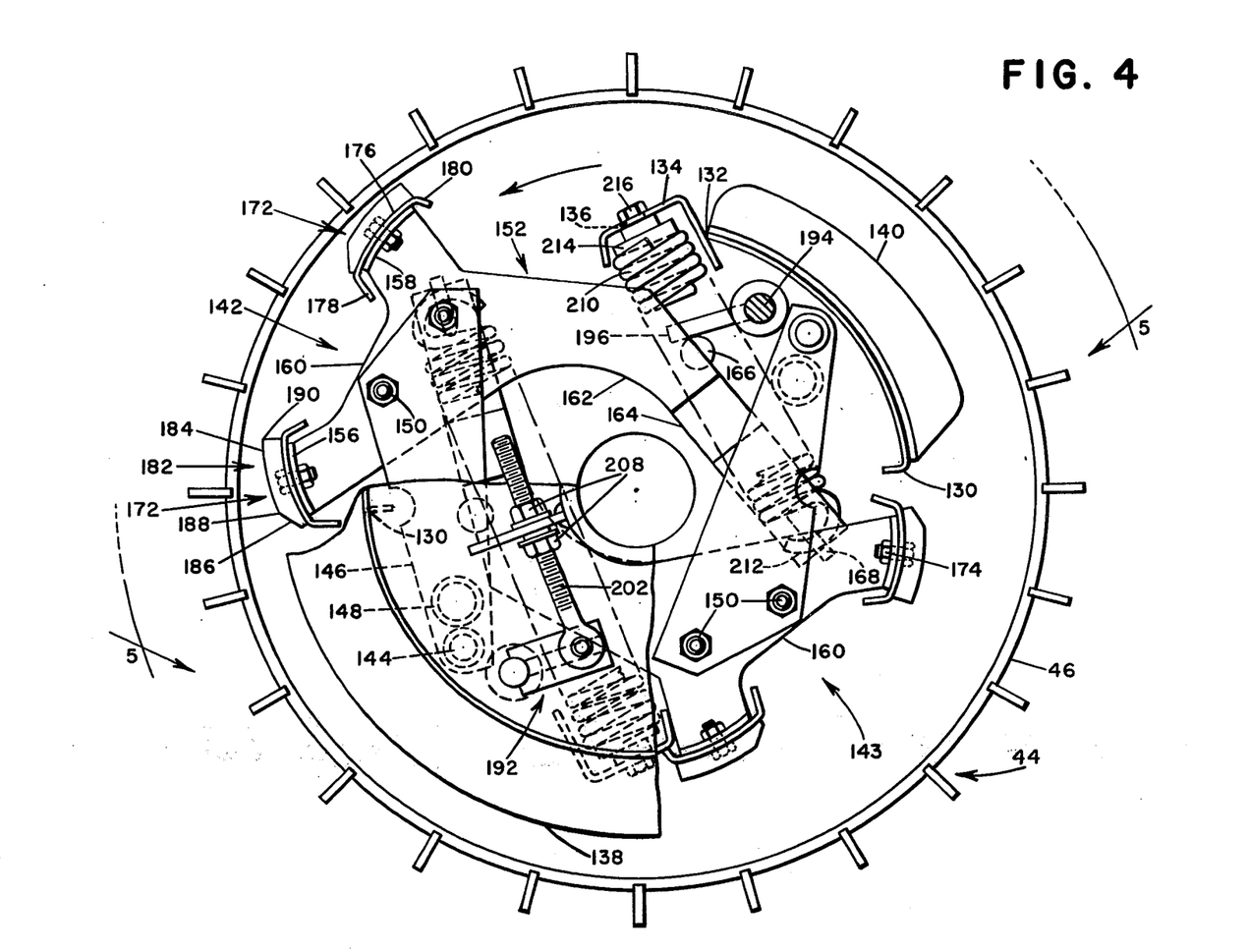
FIG. 4 is a sectional view of the rotor portion taken generally on line 4—4 of FIG. 3 but with a portion of the front of the rotor superimposed on the view to show an adjusting eyebolt, and also with the grate added and one threshing bar assembly at minimum clearance and the other fully retracted.

A threshing bar indicated generally by the numeral 172 spans each pair of threshing bar support flanges 156 and 158 and extends axially from just rearward of the forward edge of the opening in the shell 128 to approximately the rearward edge of the shell 124 and is attached to the threshing bar support flanges by suitable fasteners 174. Each threshing bar includes a base portion 176 having a generally channel shaped cross section with leading and trailing flanges 178 and 180, respectively. Mounted on each threshing bar base portion is a series of helically arranged vanes or material control elements 182. Each vane has an arcuate outer edge 184, an inclined leading edge 186, meeting the outer edge 184 at a leading corner 188, and a trailing corner 190. As can be seen in FIG. 4, the leading bars 172 in each threshing bar assembly 142 and 143 and the leading corners 188 of each vane 182 have greater radial concave clearances than the corresponding trailing bars 172 and corners 190.

A stop arm assembly 192 includes a stop arm 194 journaled in the bearing washers 112 of the front, intermediate and rear bulkheads 104, 106 and 108 respectively. Between the intermediate and rear bulkheads 106 and 108 respectively a pair of opposite stop lugs 196 are attached rigidly to the stop arm 194 and are located axially so that they can pass between the opposite spring arm portions 162 to engage the stop bosses 166. The stop arm 194 extends a short distance through the forward bulkhead 104 and has rigidly attached to it a radially extending bell crank 198, which carries, rigidly attached at its free end, a forward extending short cylindrical stud 200. The rotational position of each stop arm assembly 192 is controlled by an eyebolt 202 having an eye 204 engaging the bell crank stud 200 and a threaded portion 206 passing through the hole 119 in the respective gusset 118 and adjusted and secured by nuts 208, one on each side of the gusset 118.

Each threshing bar assembly 142 and 143 and hence threshing bar 172 is biased or urged outwards by a set of three helical tension springs, each spring being indicated generally by the numeral 210 and having a hook portion 212 engaging a hole 170 of the respective spring bar 168 and an opposite end having a spring plug nut 214 threaded into it and secured at the spring support angle 134 by a retaining bolt 216 passing through a hole 136 in the support angle.

The rearward or downstream frusto-conical or separator portion 94 of the rotor 58 (best seen in FIG. 2) also includes a central tube 218 on which are mounted a series of radially extending bulkheads 220 carrying a series of spaced separator bars 222 lying generally in a frusto-conical surface of revolution. Each separator bar 222 carries on its outer surface a series of helically arranged vanes or material control moving elements 224. The frusto-conical portion of the rotor extends rearward partly into the fan housing 76.

Although the embodiment here described is that of a cylindrical threshing rotor, it is clear that the invention of a yieldably and pivotally mounted or rocking threshing bar could be embodied in a non-cylindrical rotor such as one having a frusto-conical form. In such an embodiment (as well as in the present one), the pivot axis (center line of pivot rod 144 in the present embodiment) of the rocking threshing bar assembly need not be oriented to be parallel to the rotor axis but only so that the threshing bars may yield or pivot in the direction of increasing concave clearance under the action of crop material or foreign body forces.

In operation, the stop arm assembly 192 is adjusted to produce a preselected nominal clearance between the threshing bars 172 and the threshing grate 44. Nuts 208 on the eyebolt 202 are manipulated as required to fix the rotational position of the stop arm assembly 192 and hence of the stop lugs 196 so that with the threshing bar assemblies 142 and 143 urged outwards by the springs 210 and the stop bosses 166 engaging the stop lugs 196, the preselected nominal or "stopped" clearance between threshing bars and grate is obtained. It would be convenient to provide a visual indication outside of the threshing zone of the clearance for which the stop arm assembly 192 is set. The angular position of the bell crank 198 is, of course, directly related to this clearance and, for example, a suitable calibrated scale might be mounted on the forward face of the forward bulkhead 104 of the cylinder against which the position of the bell crank 198 could be read to determine the clearance setting, but such an arrangement is not shown in the drawings.

Figure 6:
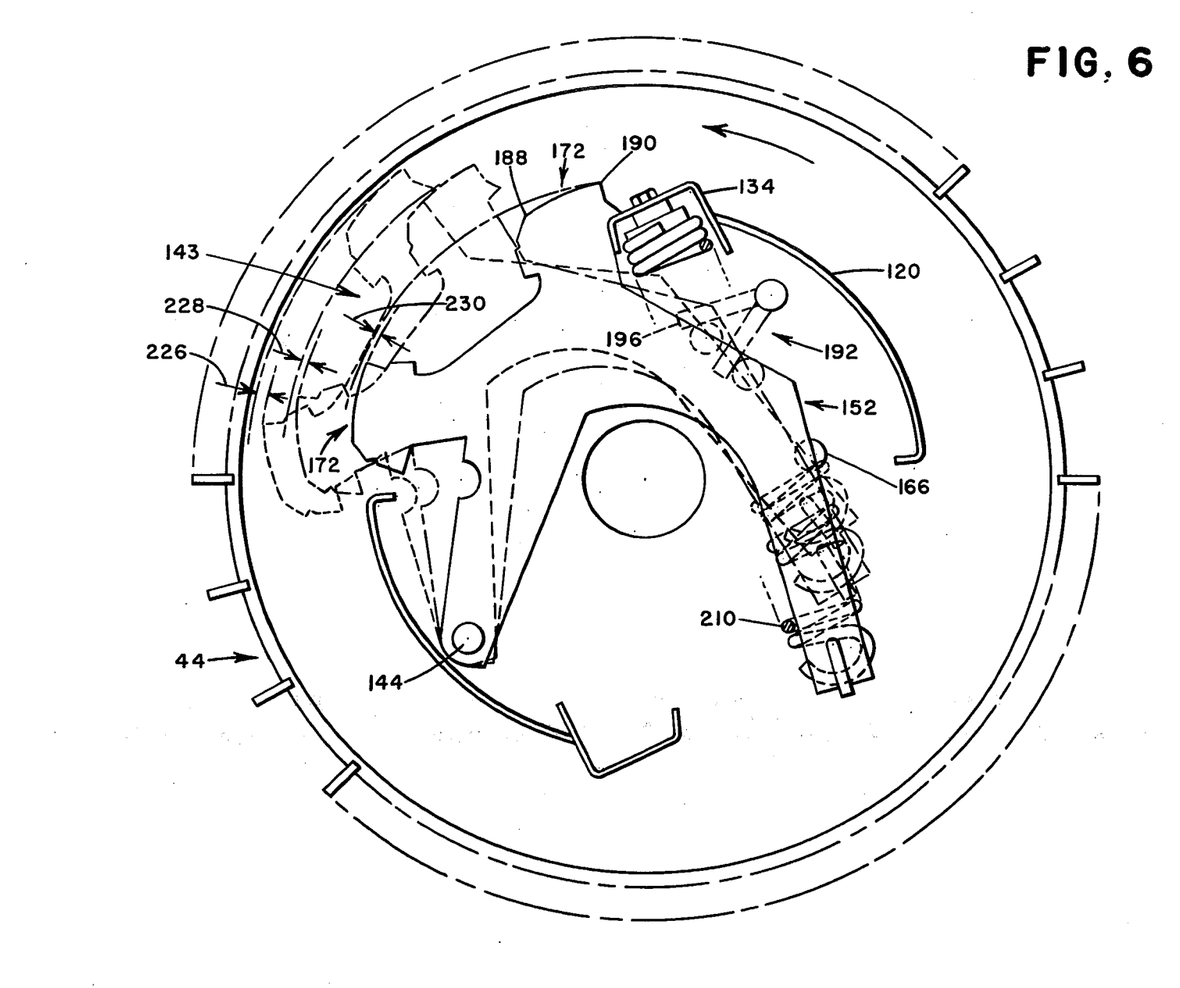
FIG. 6 is a diagrammatic view similar to FIG. 4 but with one threshing bar assembly and related parts removed and indicating a range of pivoting deflection for one threshing bar assembly.

In FIG. 6 as well as in FIG. 4, threshing bar assembly 143 is shown in a fully deflected position, a condition which may result from a foreign body such as a rock entering the threshing zone. As can be seen in FIG. 4, the limit of deflection is reached when the flange 180 of the threshing bar engages the spring support angle 134 and that in this position the stop bosses 166 are well clear of the stop lugs 196. It will be seen too that when the threshing bar assemblies 142 and 143 are in their fully retracted position the radial clearance between the threshing bars 172 and the grate 44 is still less than that between the shell 120 and the grate.

In FIG. 6 the threshing bar assembly 143 is also shown in phantom outline in two "stopped" or working positions corresponding to two different settings of the stop arm assembly 92 in which the threshing bar assembly 143 is biased outwards by the springs 210 until the stop bosses 166 engage the stop lugs 196. Successful results have been obtained in a rotor having a maximum diameter of about 24 inches when a range of adjustable "stopped" grate clearance of 0 to about 1½ inches is provided and when maximum deflected clearance is about 2¾ inches. Typically, small clearances of the order of ¼ inch are used in harvesting small grain whereas clearances of 1 to 1½ inches may be used in corn.

In harvesting operation, the combine advances over a field and crop material is delivered to the infeed portion 96 of the rotor 58 where it is engaged by the helical flighting 138 which, in cooperation with the helical material moving elements 38 of the infeed housing 36, propel it spirally and rearwardly into the threshing zone 99 between the rotor threshing portion 98 and the threshing grate 44. While rearward propulsion of the mass of crop material continues through cooperation between the rotor and the helical elements 46 of the grate 44, threshing takes place and grain is expelled through the grate.

Threshed and separated material passes outwards through the threshing grate 44 and the separator grate 48 to be received by the cleaner assembly 72 where further separation takes place so that material is discharged into the clean grain auger 86, the tailings auger 88 or, in the case of the trash, rearwards into the fan housing 76. Straw remaining within the separator grate 48 also is propelled rearwardly and discharged into the fan housing 76 for discharge downwards through the chute 78.

In normal operation, when the flow of material to the threshing zone 99 is relatively uniform and somewhat below the maximum capacity of the zone, the bias of the springs 210 combined with centrifugal force will overcome the forces of the crop material which tend to force the threshing bar assemblies 142 and 143 away from the grate 44 and the threshing bar assemblies will be maintained in their preselected "stopped" position, that is with the stop bosses 166 against the stop lugs 196. However, in practice the rate of feeding of the threshing zone may vary widely as the combine harvests crop of varying density or stand so that sometimes material may be fed to the threshing zone in "slugs" momentarily overloading it. Being pivotally spring loaded, the threshing bar assemblies 142 and 143 can yield away from the grate 44 in a rocking movement pivoting about the pivot rod 144 as required to accommodate the greater flow of material. The effect of the yielding or rocking is that the rotor 58 and in particular the threshing portion 98 can accommodate crop material feed rates momentarily exceeding the average capacity of the threshing zone 99 without the excessive fluctuations in torque loading of the rotor drive mechanism, or jamming or plugging of the threshing zone 99, which may easily occur with a conventional rotor in similar conditions.

In a similar way, if a rock is inadvertently picked up from the field by the gatherer unit 30 and delivered to the threshing zone 99 and is encountered by a threshing bar 172, the result may be either: (a) that the threshing bar assembly 142 or 143 simply yields to cushion the impact of the rock thus reducing peak loading on the rotor and its drive system and possibly yielding sufficiently to allow the rock to pass one or more threshing bars 172 before being positively conveyed spirally and rearwardly through the threshing zone; or (b) if the rock tends to wedge between a threshing bar 172 and the threshing grate 44, the threshing bar assembly 142 or 143 may yield to the point where increased spring tension balances the wedging action of the rock between the grate and the threshing bar and a dynamic equilibrium is reached in which the threshing bar propels the rock spirally and rearwardly through the threshing zone.

It is typical in conventional combined rotary threshing and separating mechanisms and also in the described embodiment of this invention that the critical area or bottleneck for accommodating foreign bodies or momentarily excessive flows of crop material is in the threshing zone where relatively small clearances must be maintained to effect the threshing action. For example, with respect to radial clearance, the diameter of the shell portion 120 of the infeed portion of the rotor 96 is less than the minimum swept diameter corresponding to full deflection of the threshing bar assemblies 142 and 143 and there is correspondingly generous axial space between the helical material moving members 140. Also, in the separator portion 94 of the rotor 58 the generous circumferential spacing of the separator bars 222 and relatively high radial clearance between the bars and the separator grate 48 are adequate to cope with any material which has passed through the threshing zone 99.

As can be seen in FIG. 6, for each threshing bar assembly 142 or 143, the particular combination of pivot 144 location and disposition of threshing bars 172 on the threshing bar carriers 152 and 154 is such that: (a) the leading corner 188 of each bar has greater clearance than the trailing corner 190 with respect to the grate 44; (b) similarly the leading bar of each pair has greater clearance than the trailing bar; and (c) that although the difference in clearance between front and rear bars perceptibly decreases as the threshing bar assembly is increasingly deflected (see offset dimensions 226, 228 and 230, respectively, in FIG. 6) the attitude of the individual bars and of the bars taken as a pair, in relation to the inside cylindrical surface of the grate 44, remains substantially unchanged between positions of minimum and maximum clearance.

I claim:

1. In a threshing device for agricultural crops including a concave, an improved threshing rotor generally concentrically associated with and at least partially wrapped by the concave so that a threshing zone is created between the rotor and concave, said zone having an inlet for receiving untreated crop material and an outlet for discharging material from which grain has been separated, the rotor comprising:
   a rotor frame having opposite ends and an axis of rotation and including pivot means;
   a first threshing bar assembly, including a first generally axially extending threshing bar having leading and trailing edges, supported by the pivot means for rocking movement between positions corresponding to maximum and minimum concave clearance between the threshing bar and the concave, the threshing bar moving in a crop threshing relationship to the concave as the rotor is rotated;
   resilient means, supported by the frame, engaging the threshing bar assembly for urging the threshing bar in the direction of reducing concave clearance; and
   stop means including a first part carried by the frame and a second part carried by the threshing bar assembly, the first part being engageable by the second part to limit the movement of the threshing bar in the direction of reducing concave clearance.

2. The invention defined in claim 1 and including adjustment means operatively engaging the stop means so that the clearance between the threshing bar and the concave corresponding to operative engagement between the first and second parts of the stop means is adjustable.

3. The invention defined in claim 2 wherein the adjustment means includes control means carried by a frame end and operable to adjust the stop means.

4. The invention defined in claim 1 wherein the leading edge of the threshing bar has a greater concave clearance than the trailing edge, and the pivot means is disposed so that when the threshing bar assembly pivots in the direction of increasing concave clearance the threshing bar moves in a trailing arcuate path, relative to the direction of rotation, and the attitude of the threshing bar relative to the concave for any given rotational position of the rotor remains approximately unchanged between the minimum and maximum concave clearance positions.

5. The invention defined in claim 4 wherein the frame includes a generally axially extending outer wall having an arcuate outer surface generally concentric with the axis of rotation and the clearance between the outer surface and the concave is greater than the maximum clearance between the threshing bar and the concave.

6. The invention defined in claim 1 wherein, in relation to the concave, the leading edge of the threshing bar has a greater clearance than the trailing edge and the difference in these clearances decreases as the concave clearance increases.

7. The invention defined in claim 1 and including a plurality of helically disposed, generally radially outward extending vane-like first material control elements carried by the frame for cooperating with the concave to move crop material axially when the rotor is rotated and wherein the concave surrounds the rotor and the inlet is adjacent one end of the rotor and the outlet is axially removed from the inlet.

8. The invention defined in claim 7 wherein at least one material control element is carried by the threshing bar.

9. The invention defined in claim 7 and including a second threshing bar assembly supported by the pivot means and including a second threshing bar generally diametrically opposed to the first threshing bar and moving in a crop threshing relationship to the concave as the rotor is rotated.

10. The invention defined in claim 1 and further including a second threshing bar assembly pivotally supported by the pivot means independently of the first threshing bar assembly and including a second threshing bar approximately diametrically opposite the first threshing bar.

11. The invention defined in claim 10 wherein each threshing bar assembly includes an additional threshing bar adjacent and approximately parallel to the first and second threshing bars respectively, said bars, in terms of rotation of the rotor, constituting leading and trailing bars.

12. The invention defined in claim 11 wherein in each threshing bar assembly, for at least part of the rocking movement, the leading bar has a greater concave clearance than the trailing bar.

13. In a crop separator including a grate, an improved rotor at least partially surrounded by the grate and comprising:
   a frame having opposite ends and an axis of rotation;
   a threshing bar assembly, including a first generally axially extending threshing bar having a threshing surface, yieldably mounted on the frame; and
   bias means connected between the frame and the threshing bar assembly for urging the threshing bar radially outwards.

14. The invention defined in claim 13 in which the frame includes a generally cylindrical outer wall having an opening and the threshing bar is disposed in the opening so that the threshing surface is disposed radially outwards of the outer wall.

15. The invention defined in claim 13 and including a stop means carried by the frame for engaging the threshing bar assembly to limit movement of the bar in a radially outwards direction.

16. The invention defined in claim 15 wherein the stop means is adjustable and the rotor further includes control means carried by an end of the frame and operatively associated with the stop means for adjusting the stop means, so as to vary the limitation on radially outward movement of the bar.

17. The invention defined in claim 13 wherein the threshing bar assembly includes a second threshing bar having a threshing surface and disposed approximately parallel to the first threshing bar.

18. The invention defined in claim 17 and further including a second threshing bar assembly carried by the frame approximately diametrically opposite the first threshing bar assembly.

19. In an axial flow rotary separator for agricultural crops including a housing having a grate and opposite inlet and outlet ends, an improved rotor for rotation within the housing in a crop threshing relationship with the housing so that at least some threshed material is discharged outwards through the grate comprising:
   a frame;
   a threshing bar yieldably mounted on the frame; and
   bias means connected between the frame and the threshing bar for urging the threshing bar outwards towards the housing.

20. The invention defined in claim 19 and including a stop means carried by the frame for engaging the threshing bar to limit movement of the bar in an outwards direction.

21. The invention defined in claim 20 wherein the stop means is adjustable and the rotor further includes control means carried by the frame and operatively associated with the stop means for adjusting the stop means so as to vary the limitation on outward movement of the bar.

22. The invention defined in claim 20 wherein the threshing bar is generally axially extending and the threshing bar and the housing carry generally helically arranged material control elements for propelling material from the inlet end towards the outlet end.

23. The invention defined in claim 22 wherein the rotor includes an infeed portion adjacent the inlet end of the housing, said portion having at least one generally helical material moving element for receiving crop material and propelling it towards the threshing bar.

24. The invention defined in claim 23 wherein the rotor includes a downstream separating portion having at least one generally axially extending separating bar for receiving material propelled downstream by the threshing bar.

25. The invention defined in claim 19 and further including a grain cleaner assembly surrounding the housing for receiving and cleaning threshed material discharged through the grate.

* * * * *